United States Patent
Nakashima et al.

(10) Patent No.: US 10,200,370 B2
(45) Date of Patent: Feb. 5, 2019

(54) APPARATUS, SYSTEM, AND METHOD FOR AUTHORIZING A SERVICE

(71) Applicants: Canon Information and Imaging Solutions, Inc., Melville, NY (US); Canon U.S.A., Inc., Melville, NY (US)

(72) Inventors: Kosuke Nakashima, Kawasaki (JP); Atsushi Kamasuka, Matsudo (JP); Song Cang, Jericho, NY (US); Robert Dellago, Rocky Point, NY (US); Jiayin Peng, College Point, NY (US); Ryutaro Watanabe, Kawasaki (JP)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 105 days.

(21) Appl. No.: 15/073,485

(22) Filed: Mar. 17, 2016

(65) Prior Publication Data
US 2016/0277407 A1 Sep. 22, 2016

Related U.S. Application Data

(60) Provisional application No. 62/136,206, filed on Mar. 20, 2015.

(51) Int. Cl.
*G06F 17/30* (2006.01)
*H04L 29/06* (2006.01)
(Continued)

(52) U.S. Cl.
CPC .............. *H04L 63/10* (2013.01); *G06F 21/00* (2013.01); *G06F 21/44* (2013.01)

(58) Field of Classification Search
CPC ........ G06Q 50/22; G06Q 99/00; G06F 21/00; G06F 21/44; G06F 17/3089; G06F 21/45; G06F 17/30879; H04L 63/10; H04L 29/06; H04L 67/02; H04L 63/067; H04L 63/0823; H04L 63/0853; H04L 9/3215; H04L 9/3228; H01L 27/14609; H01L 27/1463;
(Continued)

(56) References Cited

U.S. PATENT DOCUMENTS

2004/0017475 A1* 1/2004 Akers .................... G06Q 50/22
348/207.1
2007/0226148 A1 9/2007 Noda
(Continued)

OTHER PUBLICATIONS

Scottie's Tech.Info, "Browser Fingerprints: What they are, how they work, and what it means to you", Apr. 12, 2015, downloaded from http://scottiestech.info/2015/04/12/browser-fingerprints-what-they-are-how-they-work-and-what-it-means-to-you/.
(Continued)

*Primary Examiner* — Abiy Getachew
(74) *Attorney, Agent, or Firm* — Canon U.S.A., Inc. IP Division

(57) ABSTRACT

Systems include a service-provider device; and a browser loaded on a first device. To connect the service-provider device with the first device, the browser fetches a device ID from the first device, and sends a request for a service to the service-provider device with the device ID. The service-provider device determines whether the service is allowed to be provided by checking whether the device ID is registered.

19 Claims, 11 Drawing Sheets

(51) Int. Cl.
 *G06F 21/00* (2013.01)
 *G06F 21/44* (2013.01)
(58) Field of Classification Search
 CPC ......... H01L 27/14645; H01L 27/14647; H01L 31/035236; Y02A 90/22; Y02A 90/26; H04W 12/06
 See application file for complete search history.

(56) References Cited

U.S. PATENT DOCUMENTS

| | | |
|---|---|---|
| 2008/0235141 A1 | 9/2008 | Hilerio |
| 2010/0268899 A1* | 10/2010 | Etoh ................... G06F 12/0246 711/154 |
| 2011/0125655 A1 | 5/2011 | Chiyo |
| 2011/0288911 A1* | 11/2011 | Barnes, Jr. .......... G06F 3/04847 705/14.1 |
| 2012/0110198 A1 | 5/2012 | Sasaki |
| 2016/0191514 A1* | 6/2016 | Talmor .................... G06F 21/32 726/4 |

OTHER PUBLICATIONS

Gabi Nakibly et al., Hardware Fingerprinting Using HTML5, Technion—Israel Institute of Technology, Mar. 2015.

Ed Bott, Microsoft quietly rewrites it activation rules for Windows 10, Zdnet, Aug. 2015, downloaded from http://www.zdnet.com/article/microsoft-quietly-rewrites-its-activation-rules-for-windows-10/.

Paul Thurrott, Windows 10 Tip: Associate Your PC with Your Free Windows 10 License, Aug. 2015, downloaded from https://www.thurrott.com/windows/windows-10/5008/windows-10-tip-associate-your-pc-with-your-free-windows-10-license.

Jason Franklin et al., Passive Data Link Layer 802.11Wireless Device Driver Fingerprinting, Proceedings of USENIX Security '06, Jul. 2006.

* cited by examiner

APPARATUS, SYSTEM, AND METHOD FOR AUTHORIZING A SERVICE

CROSS-REFERENCE TO RELATED APPLICATIONS

This application claims the benefit of U.S. Application No. 62/136,206, which was filed on Mar. 20, 2015.

BACKGROUND

Technical Field

The present disclosure relates generally to authorizing the operation of at least one feature of an application running on an image processing device.

Background

Image processing devices are routinely deployed for both personal and commercial uses. Image processing devices may provide functionality for making photocopies, printing a document, scanning a document, generating an electronic document that represents the scanned document, transmitting data over a network, accessing a database on a remote server, or other tasks. These devices are generally shared among many different users in an office environment. In some instances, the image processing devices may require a user to be authenticated via a unique access credential in order to make use of one or more resources (e.g., applications or other functionality) available on the image processing device. Moreover, certain destination systems that are accessible by the image processing device (or an application executing thereon) may also require the user to be authenticated.

SUMMARY

Methods, systems, and computer-readable media for managing processes executed on an image processing device are disclosed.

Some embodiments include a server that selectively generates and aggregates authorization data that is used in authorizing at least one feature of at least one application executing on an image processing device. The system selectively generates a key as part of the authorization data which is selectively provided to the respective image processing devices and receives device specific data therefrom. The device specific data is stored with the authorization data that defines authorization permissions. In response to data indicating that the at least one feature of the at least one application is being used, the server compares the request for access with the stored authorization data to determine if the request should be granted and permits use of the at least one feature in a case where the permissions match the request or inhibits use in a case where the permission do not match.

In other embodiments, this authorization scheme may be applied on the application level as well as an individual feature level.

In other embodiments, the authorization data may be transferrable between different image processing apparatus by the server at one of a direction of an administrator or automatically after a previously authorized use.

DETAILED DESCRIPTION

The following paragraphs describe certain explanatory embodiments. Other embodiments may include alternatives, equivalents, and modifications. Additionally, the explanatory embodiments may include several features, and a particular feature may not be essential to some embodiments of the devices, systems, and methods that are described herein.

Figure 1:
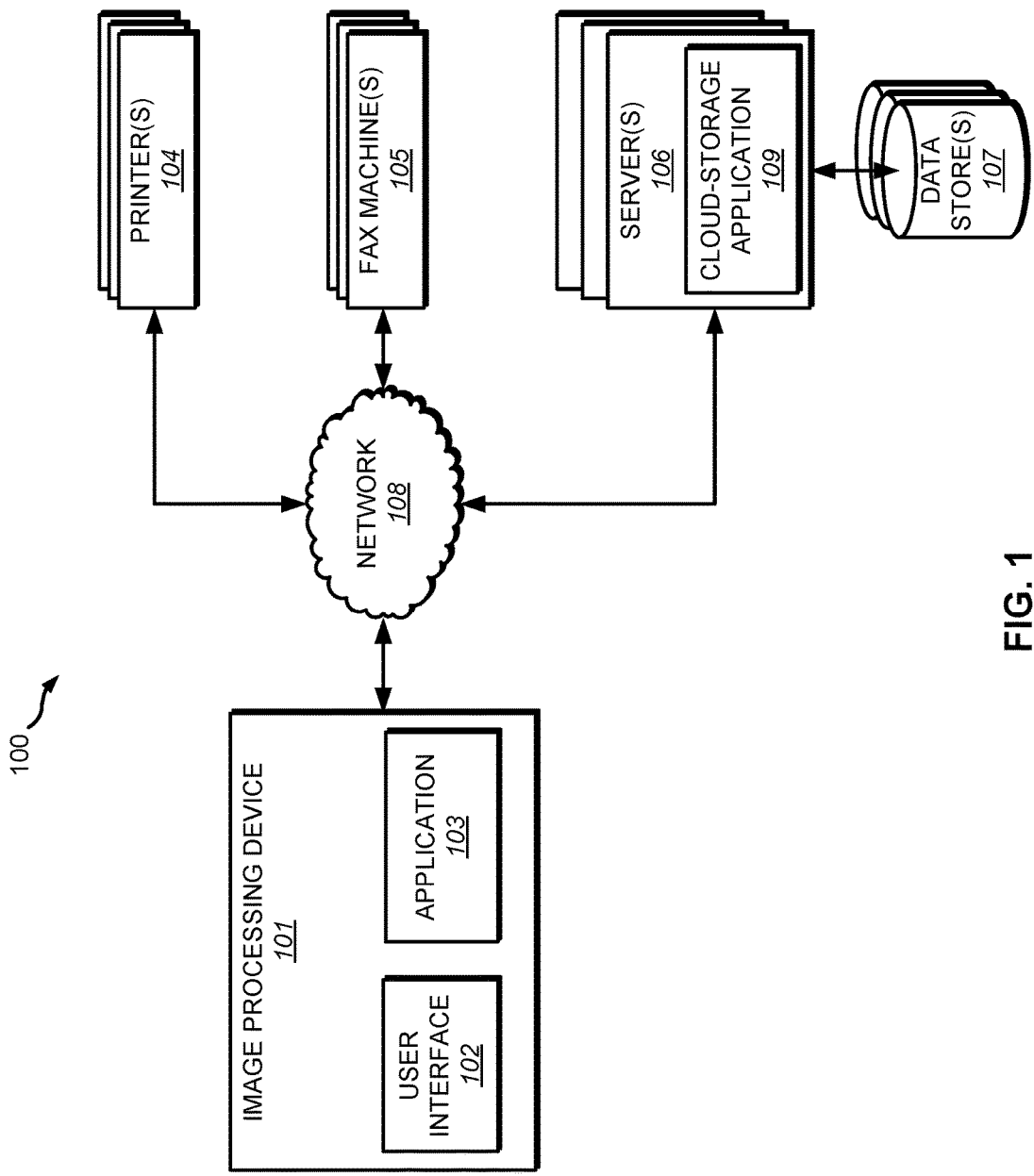
FIG. 1 illustrates an example embodiment of a network environment.

FIG. 1 illustrates an example embodiment of a network environment 100. In the network environment 100, an image processing device 101, one or more printers 104, one or more fax machines 105, and one or more servers 106, which may each be coupled to one or more data stores 107, are connected to a network 108.

The image processing device 101 includes a user interface 102 and an application 103. Also, the image processing device 101 includes hardware, or hardware and software, for providing the functionality of the image processing device 101. In some embodiments, the image processing device 101 performs one or more operations of one or more methods described or illustrated herein, or the image processing device 101 provides functionality described or illustrated herein.

The image processing device 101 includes hardware, or a combination of hardware and software, that provides scanning functionality. For example, the image processing device 101 may include an image sensor or a camera for capturing an image. In some embodiments, the image processing device 101 scans a physical document to generate electrical signals, which are converted to digital image data that represents the scanned physical document.

The image processing device 101 may convert the digital image data into an electronic document that represents the scanned physical document and send the electronic document to a destination. In some embodiments, the send functionality includes a conversion of the electronic document from a first data format to a second data format during the transmission of the document to the destination (e.g., converts and streams the electronic document to the destination). In other embodiments, the send functionality includes a conversion of the electronic document from a first data format into a second data format to generate a data object that is temporarily stored (e.g., in memory or on a storage medium) until the conversion is complete. In these embodiments, the transmission of the converted document may occur upon receiving a notification that the generation of the data object that includes the converted electronic document has been completed. Once completed, the temporary data object may be deleted from the memory or storage medium.

Additionally, in some embodiments, the scan-and-send application captures and transmits electronic document data to a third-party application that is hosted on and executes on a remotely-located server that is accessible via a network, such as the Internet. An example of a third-party application is a cloud-based storage application 109 that provides a user with a predetermined amount of storage space and that is selectively accessible in response to entry of authorization credentials (e.g., user name, password).

The image processing device 101 includes the user interface 102. The user interface 102 includes hardware, or a combination of hardware and software, for providing the functionality of the user interface 102. The user interface 102 may include an operation panel. The user interface 102 may output signals and receive input signals via the operation panel so as to facilitate interaction between a user and the image processing device 101, and the operation panel may include a hard key panel or a touch-sensitive display. A user may provide input operations via the operation panel to control the image processing device 101. For example, the user may press one or more hard buttons to issue one or more commands. Further by way of example, a user may provide a touch input to an interface element shown on the display to issue a command or to make a selection. Moreover, the image processing device 101 may output information to the user and issue requests by outputting images on a display.

The application 103 includes programs and related data. In some embodiments, the application 103 executing on the image processing device 101 causes the image processing device 101 to perform one or more operations of one or more methods described or illustrated herein or provides functionality described or illustrated herein. For example, programs of the application 103 may include instructions that, when executed by one or more processors, cause the image processing device 101 (e.g., one or more processors of the image processing device 101) to perform one or more operations described herein.

In some embodiments, the application 103 includes a browser, and the user interface 102 shows information generated by the browser. The browser may be a web browser and may be used to access a resource, such as a web page. The browser may enable a user to display and interact with text, images, form elements, or other information typically located on a web page served by a web server on the World Wide Web or a local area network. The browser may support various types of downloadable, executable software modules, such as applets or plug-ins. For example, the browser may incorporate a virtual machine configured to execute a program, such as a JAVA applet, that is embedded in a web page accessed by the browser. The image processing device 101 may have various add-ons, plug-ins, or other extensions for use in or with the browser.

In some embodiments, the application 103 includes one or more programs for controlling access to one or more resources on the image processing device 101. The application 103 may include one or more programs for controlling access to the application 103 or a particular functionality of the application 103. And access to one or more resources of the application 103 may be controlled based on a credential associated with the entity attempting to access the one or more resources of the application 103. Policies for controlling access to various resources of the application 103 may be stored at the image processing device 101. Also, in some embodiments, the application 103 includes one or more programs for accessing services, such as an authentication service. For example, the application 103 may cause the image processing device 101 to send, to an authentication service via the network 108, a request to authenticate a user before the user is granted access to a resource of the image processing device 101 or the application 103.

Once logged in to the application 103, a user gains access to one or more resources of the application 103, including a task-specific functionality of the application 103. The task-specific functionality of the application 103 may enable the user to perform one or more tasks using the application 103. For example, the application 103 may provide various functions, features, and user interfaces for processing image data, transmitting data over a network, managing one or more databases, or performing other tasks. In some embodiments, the application 103 is configured to use one or more resources of the image processing device 101 to perform a process in response to an instruction from the user. For example, the application 103 may use a functionality of, or information on, the image processing device 101 to carry out a scan-and-send process based on user inputs.

In some embodiments, the application 103 executing on the image processing device 101 provides functionality for maintaining and accessing information in a data structure, which may be any suitable data structure for organizing data. For example, information associated with a user or process may be added as one or more entries into a data structure. The application 103 executing on the image processing device 101 may store or retrieve data in a memory or on a hard disk of the image processing device 101. In some embodiments, the image processing device 101, when executing the application 103, performs various operations with a data store. Examples of operations include adding entries to a data store, deleting entries from a data store, modifying entries in a data store, searching for entries in a data store, and retrieving entries from a data store.

The application 103 may provide functionality for generating information and providing the information to the user interface 102 of the image processing device 101. The information may include text, images, form elements, files, executable programs, or other suitable information. The information provided by the application 103 may include content for presentation on a display of the image processing device 101.

In some embodiments, the application 103 is an authorization-based application that executes on the image processing device 101, but only in response to satisfying one or more authorization criteria that are managed by an authorization application (e.g., a cloud-connect application) executing on a remote server accessible via a wide area network, such as the network 108 described below. The application 103 may include one or more features that control the image processing device 103 to perform one or more functions. Each of these features may be individually or collectively authorized via different types of authorization criteria. In these embodiments, the application 103 obtains authorization data that defines which capabilities (e.g., functionalities) of the application 103 are available for use. Device-specific information for the image processing device 101 is transmitted to a server 106 that executes an authorization application (authorization server 106), and the device-specific information is stored in a data store 107 connected thereto. Each time the application 103 or an individual feature is selected for use via the user interface 102 (e.g., via an operation panel), a data object, including the authorization request that identifies the requested capability of the application and a device-specific identifier, is communicated to the authorization server 106.

The authorization server 106 selectively determines if the particular image processing device 101 is permitted to use the application 103 (or a particular feature of the application 103). If the result of this query is negative, which indicates that use is not permitted, the application 103 may generate a message indicating to the user that permission is not granted and including at least one image element enabling the user to selectively acquire permission to make use of the application 103 (or a feature thereof).

In other embodiments, the application 103 generates a failure message, for communication to the authorization application executing on the authorization server 106, which can be used to generate notifications or other messages to be transmitted to an entity responsible for acquiring access to the application 103 (or a capability of the application 103).

The image processing device 101 may access one or more resources on the network 108. The image processing device 101 is configured to interact with one or more of the following: the one or more printers 104, the one or more fax machines 105, and the one or more servers 106.

The one or more printers 104 are any suitable devices for printing (e.g., inkjet printers, laser printer, additive-manufacturing devices). The one or more printers 104 may include one or more multifunction peripherals, one or more copiers, one or more single-function printers, or other devices with printing capabilities. In some embodiments, at least one of the one or more printers 104 is coupled to at least one of the one or more fax machines 105 and can print data sent from the fax machines 105 to the printers 104.

Additionally, the application 103 is described as executing on the image processing device 101 only for explanatory purposes, and that application 103, including one or more capabilities that are made available according to a subscription-based scheme, may also be executed on any printer 104 that is capable of executing the application 103, any fax machine 105 that is capable of executing the application 103, and any server 106 that is capable of executing the application 103.

The one or more fax machines 105 are any suitable devices for sending and receiving a facsimile communication. In some embodiments, at least one of the one or more fax machines 105 can receive a digital facsimile communication. Also, at least one of the one or more fax machines 105 may receive an analog facsimile communication, and the one or more fax machines 105 may provide scanning functionalities. For example, each of the one or more fax machines 105 may include an image sensor or a camera for capturing an image and may scan a physical document to generate a facsimile communication representing the scanned physical document. In some embodiments, at least one of the one or more fax machines 105 generates an analog signal and sends the analog signal to a destination, or one of the one or more fax machines 105 scans a physical document to generate electrical signals that are converted to digital image data representing the scanned physical document. The digital image data may be converted into an electronic document representing the scanned physical document and sent to a destination.

At least one of the one or more fax machines 105 may be able to send and receive facsimile communications over the Public Switched Telephone Network (PSTN) or be able to send and receive facsimile communications over the Internet. Additionally, at least one of the one or more fax machines 105 may able to send and receive facsimile communications over both the PSTN and the Internet. And in some embodiments, at least one of the one or more fax machines 105 includes printing capabilities for printing received facsimile communications, or at least one of the one or more fax machines 105 is coupled to at least one of the one or more printers 104 and sends data to the printers 104 for printing.

The one or more servers 106 each include hardware, or a combination of hardware and software, for providing the functionality of the respective one or more servers 106. And one or more of the servers 106 may be coupled to one or more of the data stores 107. In some embodiments, at least one of the one or more servers 106 is unitary, and in some embodiments, at least one of the one or more servers 106 is distributed. Furthermore, at least one of the one or more servers 106 may span multiple locations or span multiple machines, or two or more of the one or more servers 106 may reside in a single computing system in any suitable manner. Also, at least one of the one or more servers 106 may include software that is provided as a component of a software application, and at least one of the one or more servers 106 may include software that is provided as a stand-alone software application.

In some embodiments, at least one of the one or more servers 106 operates a cloud-storage application 109 that provides one or more network services for the image processing device 101. Examples of network services include directory services, authentication services, naming services, and secure access to resources on the network 108. The cloud-storage application 109 allows a user to create and store document data in various data formats. The cloud-storage application 109 also enables a user to selectively retrieve document data in various data formats for further processing, such as outputting the retrieved document to a printer 104 or transmitting the retrieved document data as an electronic message or a facsimile message. The cloud-storage application 109 can store data in any applicable format. For example, the cloud-storage application 109 may cause at least one of the one or more servers 106 to receive one or more files from the image processing device 101 when the image processing device 101 executes a scan-and-send process.

Furthermore, at least one of the one or more servers 106 may provide an authentication service or an authorization service. The image processing device 101 (e.g., the application 103 on the image processing device 101) may use the authentication service to authenticate a network entity, such as a user, that seeks access to resources on the image processing device 101. The authentication service may use the Kerberos protocol or other suitable authentication method to authenticate the network entity. The authentication service may be coupled to one or more of the data stores 107, which may contain account information for network entities. The account information may include an object and its attributes, and an object may represent a user or another entity within the network 108. Attributes for a user account may include, for example, the user's password, a smart card identification number, or group membership information indicating a group to which the user belongs. When providing authentication services, the authentication service may access account information in the data store 107 for the relevant entity and provide an authentication result.

In some embodiments, the one or more servers 106 operate cloud-connect service that selectively receives a set of authorizations corresponding to at least one of (a) an application for performing predetermined operations and (b) features of the application for performing predetermined operations. The authorizations are made available to a particular entity having one or more image processing devices 101, printers 104, fax machines 105, or servers 106. The authorizations include authorization data that defines the capabilities of an application that are usable by the entity. The authorization data may define the number and types of image processing devices, printers, fax machines, and servers that can make use of an application or certain capabilities of the application. The authorization data may also include an operation range that describes the duration of the authorization and that defines the time period during which the application (or capabilities thereof) is available to the user.

The servers 106 that implement the cloud-connect service (the cloud-connect servers 106) may also include a data store for storing license data, authorization data, and device-specific data received after a particular application executing on a particular device at a particular entity has been authorized. The authorization application executing on the cloud-connect server 106 receives requests indicating that an application or a capability of the application has been requested and compares the data in the operation requests with the license data, authorization data, and device-specific data to ensure that the request complies with the authorization parameters. If compliance is detected, the cloud-connect server 106 transmits a key to the requesting device which authorizes the application or capability of the application contained in the request.

In some embodiments, at least one of the one or more servers 106 is a file server, at least one of the one or more servers 106 is a mail server, at least one of the one or more servers 106 is a web server, at least one of the one or more servers 106 is an application server, at least one of the one or more servers 106 is a fax server, at least one of the one or more servers 106 is a database server, at least one of the one or more servers 106 operates an authorization management platform, or at least one of the one or more servers 106 operates a cloud-connect service.

The network 108 couples one or more servers 106 and one or more clients to each other. The network 108 may be any suitable network. For example, one or more portions of the network 108 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these.

Figure 2:
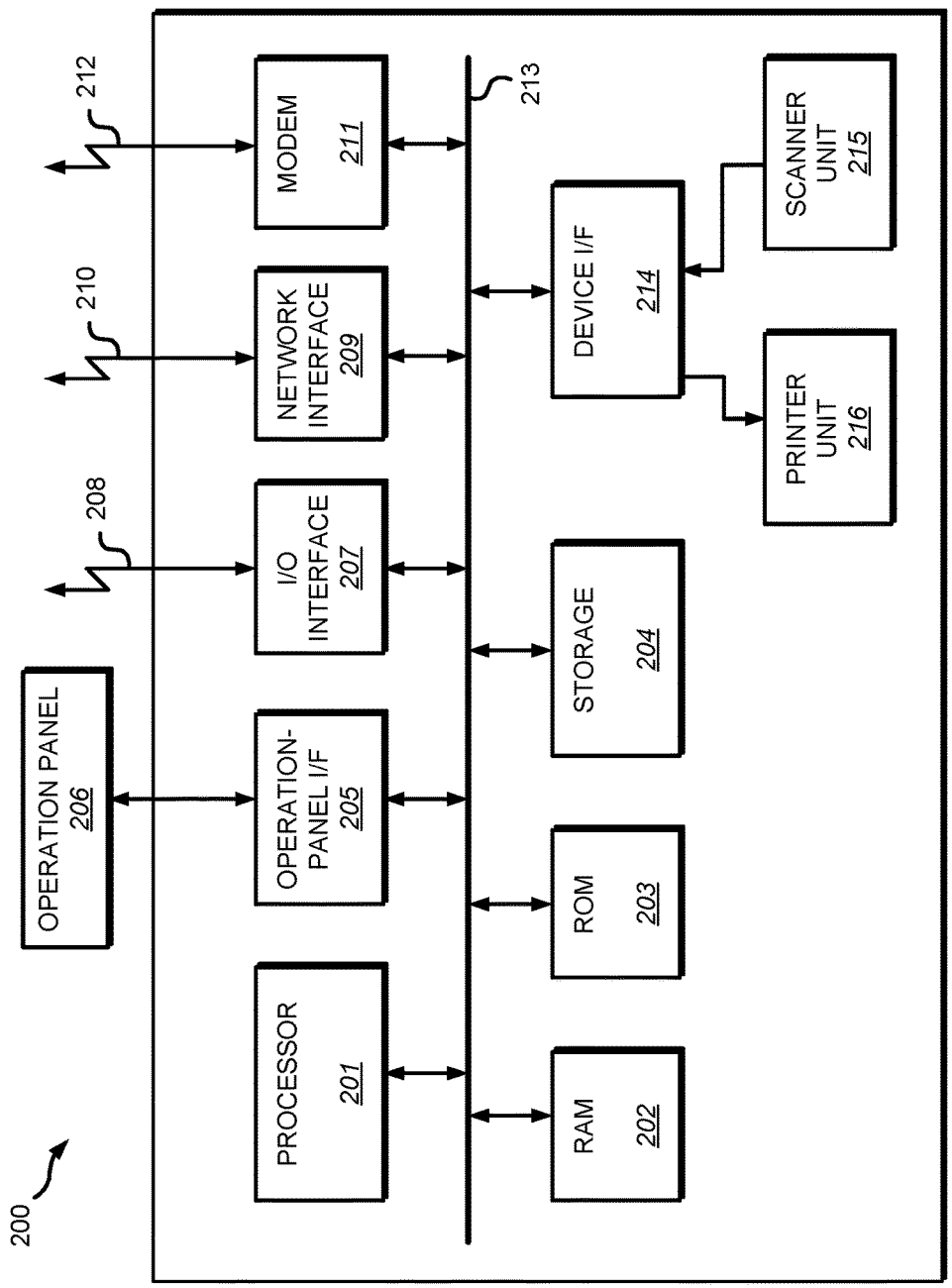
FIG. 2 illustrates an example embodiment of an image processing device.

FIG. 2 illustrates an example embodiment of an image processing device 200. In some embodiments, the image processing device 101 of FIG. 1 is identical to the image processing device 200. The image processing device 200 of FIG. 2 is a multifunction peripheral device that has scanning functionality, printing functionality, and copying functionality. However, in other embodiments, various components, modules, functions, or configurations of the image processing device 200 of FIG. 2 are combined, deleted, or modified relative to the embodiment in FIG. 2.

In some embodiments, the image processing device 200 performs one or more operations described herein, provides functionality described herein, or performs one or more operations described herein.

The image processing device 200 includes one or more processors 201. The one or more processors 201 include one or more central processing units (CPUs), which include microprocessors (e.g., a single core microprocessor, a multi-core microprocessor), or other electronic circuitry. And the one or more processors 201 may include one or more general-purpose microprocessors, application-specific microprocessors, or special purpose microprocessors. Additionally, in some embodiments the one or more processors 201 include one or more internal caches for data or instructions. The one or more processors 201 are configured to read and perform computer-executable instructions, such as instructions that are stored in a computer-readable medium. The one or more processors 201 use a random access memory (RAM) 202 as a work area while executing instructions, and the one or more processors 201 execute instructions of various programs stored in one or more memory devices. For example, the one or more processors 201 may execute programs stored in a read only memory (ROM) 203 and in storage 204.

The one or more processors 201 may perform overall control functions for the image processing device 200. The processors 201 provide the processing capability required to implement an operating system, application programs, and various other functions provided on the image processing device 200. The one or more processors 201 perform or cause components of the image processing device 200 to perform various operations and processes described herein, in accordance with instructions stored in one or more computer-readable media.

The RAM 202 can be used as a work area when the one or more processors 201 execute various instructions, such as those making up computer programs stored in the ROM 203 or the storage 204. The RAM 202 may be used as a temporary storage area for various data, including input image data and may be used as a cache memory. Also, the RAM 202 may be dynamic RAM (DRAM) or static RAM (SRAM).

The ROM 203 stores data and programs having computer-executable instructions for execution by the one or more processors 201. In some embodiments, the ROM 203 is a boot ROM, storing instructions for the booting process, or the ROM 203 includes flash memory.

The storage 204 includes one or more computer-readable storage media. A computer-readable storage medium, in contrast to a mere transitory, propagating signal per se, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se.

The storage 204 stores application data, program modules, and other information. One or more program modules stored in the storage 204 are configured to cause various operations and processes described herein to be executed. For example, in some embodiments, the storage 204 stores instructions for generating and providing, to a computing system, a web page that includes an embedded executable program that, when executed on the computing system, is operable to obtain information (e.g., a ticket-granting ticket that includes a device ID) stored on the computing system and send the information to another computing system, to determine whether a user or device that is associated with the information is authorized to access a protected resource comprising a web page, or to perform a combination of these. In some embodiments, the application 103 in FIG. 1 resides on the storage 204 and is implemented by the image processing device 200.

The storage 204 also stores other programs and data to be processed. For example, the storage 204 may store an operating system that includes programs and data for managing hardware and software components of the image processing device 200. Applications on the image processing device 200 may use the operating system to perform various operations. The storage 204 may further store other programs or drivers that enable various functions of the image processing device 200, graphical user interface (GUI) functions, or processor functions. The storage 204 may also store data files including, for example, image data, user data, configuration information, GUI components (e.g., graphical elements or templates), or other data required by the image processing device 200.

In some embodiments, the image processing device 200 includes removable or fixed computer-readable media. Where appropriate, the computer-readable media may be internal or external to the image processing device 200.

An operation-panel interface 205 provides output signals to and receives input signals from an operation panel 206. Regarding the output signals, the operation-panel interface 205 provides GUI data to the operation panel 206 for display (e.g., on a liquid crystal display (LCD)). Regarding the input signals, the operation-panel interface 205 receives input signals based on input operations at the operation panel 206 and relays the input signals to the one or more processors 201. In some embodiments, the operation panel 206 includes a touch-sensitive element operable to receive input operations or commands based on the touching of graphical objects shown on the display. In some embodiments, the operation panel 206 includes a hard-key panel.

The image processing device 200 includes one or more input/output (I/O) interfaces 207. The one or more I/O interfaces 207 may include any suitable interface type, such as a universal serial bus (USB) port, FireWire port (IEEE-1394), serial port, parallel port, or AC/DC power connection port. The one or more I/O interfaces 207 enable one or more external devices 208 to communicate with the image processing device 200 when the external devices 208 are connected to the I/O interfaces 207. Examples of external devices 208 include a near field communication (NFC) interface device (for example, an NFC reader), a smart card reader, a radio-frequency identification (RFID) reader, a device for detecting biometric information, a keyboard, a keypad, a sensor, a combination of two or more of these, or another suitable device.

A network interface 209 includes hardware, or a combination of hardware and software, that provides one or more interfaces for communication (such as, for example, packet-based communication) between the image processing device 200 and one or more other computing systems or networks 210. For example, the network interface 209 may include a network interface card (NIC) or a network controller for communicating with an Ethernet network or another wire-based network, or with a wireless NIC (WNIC) or a wireless adapter for communicating with a wireless network, such as a WI-FI network. The image processing device 200 may communicate with an ad hoc network, a personal area network (PAN), a local area network (LAN), a wide area network (WAN), a metropolitan area network (MAN), a wireless PAN (WPAN) (such as, for example, a BLUETOOTH WPAN), a WI-FI network, a WI-MAX network, one or more portions of the Internet, or a combination of two or more of these. One or more portions of one or more of these networks 210 may be wired or wireless.

The modem 211 modulates or demodulates image data and control signals. The modem 211 may be connected to the Public Switched Telephone Network (PSTN) 212 and perform input or output of information between the image processing device 200 and the PSTN 212. By way of example, the modem 211 may send or receive facsimile communications.

A system bus 213 interconnects various components of the image processing device 200, thereby enabling the transmission of data and execution of various processes. The system bus 213 may include one or more types of bus structures, including a memory bus or memory controller, a peripheral bus, and a local bus that uses any of a variety of bus architectures.

The device interface 214 is coupled to the scanner unit 215 and to the printer unit 216. The device interface 214 performs synchronous or asynchronous conversion of image data.

The scanner unit 215 includes a light source and an image sensor. The scanner unit 215 may include a glass platen or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 215 includes an optical system (e.g., a mirror, a lens) that directs the light to the image sensor. After the image sensor generates the electrical signals, an analog-to-digital converter converts the electrical signals to digital image data that represent the scanned physical document. The scanner unit 215 then outputs the digital image data to one or more other components of the image processing device 200 via the device interface 214.

The printer unit 216 is an image-output device for printing, on an output medium (e.g., paper, cardstock), an image that corresponds to image data. In response to a print command received at the image processing device 200, the printer unit 216 receives image data via the device interface 214 and outputs an image corresponding to the image data to a print medium.

Figure 3:
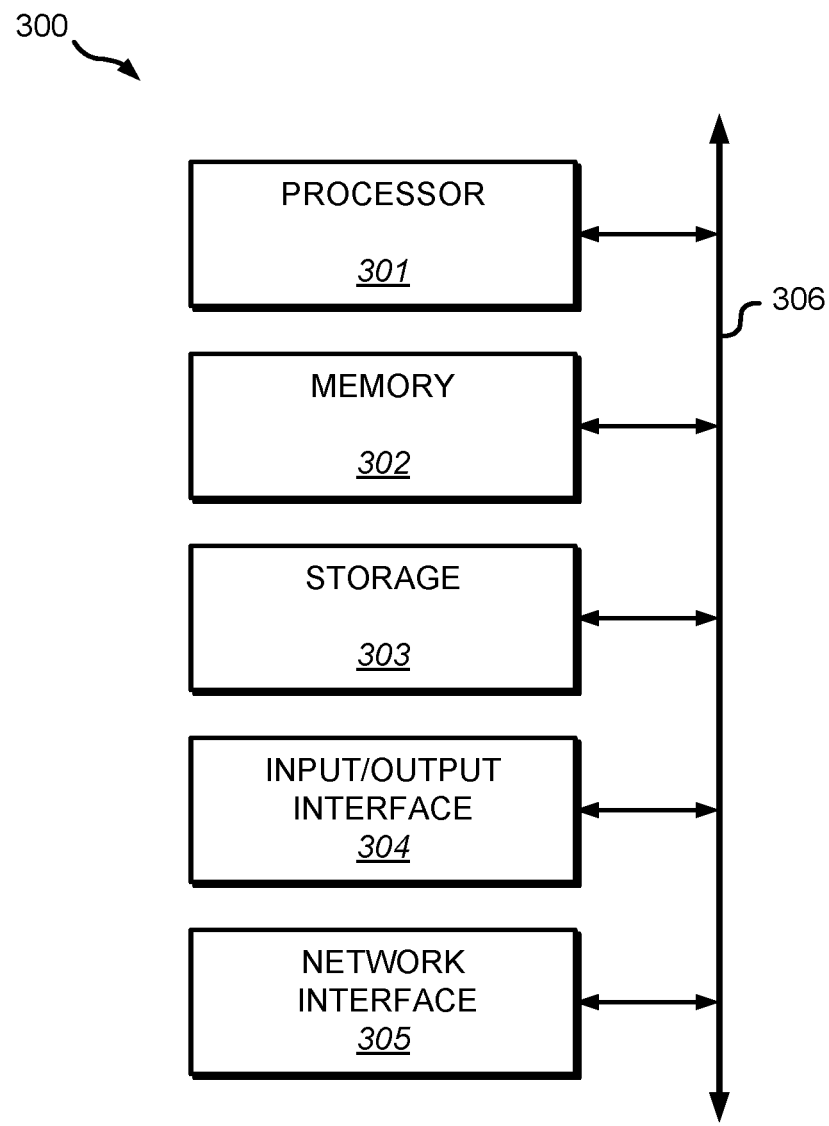
FIG. 3 illustrates an example embodiment of a computing system.

FIG. 3 illustrates an example embodiment of a computing system 300. According to various embodiments, all or a portion of the description of the embodiment of the computing system 300 is applicable to all or a portion of one or more of the image processing device 101, the one or more printers 104, the one or more fax machines 105, and the one or more servers 106 shown in FIG. 1.

Also, the term resource as used herein includes but is not limited to an object that can be processed at a computing system 300. A resource can be a portion of executable instructions or data.

In some embodiments, the computing system 300 performs one or more operations of one or more methods described or illustrated herein, or the computing system 300 provides functionality described or illustrated herein.

The computing system 300 includes one or more processors 301, a memory 302, a storage 303, one or more input/output (I/O) interfaces 304, a network interface 305, and a bus 306. The computing system 300 may take any suitable physical form. For example, the computing system 300 may be an embedded computer system, a system-on-chip (SOC), a single-board computer system (SBC) (e.g., a computer-on-module (COM), a system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

In some embodiments, the memory 302 includes a main memory (e.g., RAM) for storing instructions for the one or more processor 301 to execute or data for the one or more processor 301 to operate on. By way of example, the computing system 300 may load instructions from the storage 303 or another source to the main memory 302. During or after execution of the instructions, the processors 301 may write one or more results (which may be intermediate or final results) to the main memory 302. One or more memory buses (which may each include an address bus and a data bus) may couple the one or more processors 301 to the main memory 302. One or more memory management units (MMUs) may reside between the one or more processor 301 and the main memory 302 and facilitate accesses to the main memory 302, as requested by the processors 301.

Figure 4:
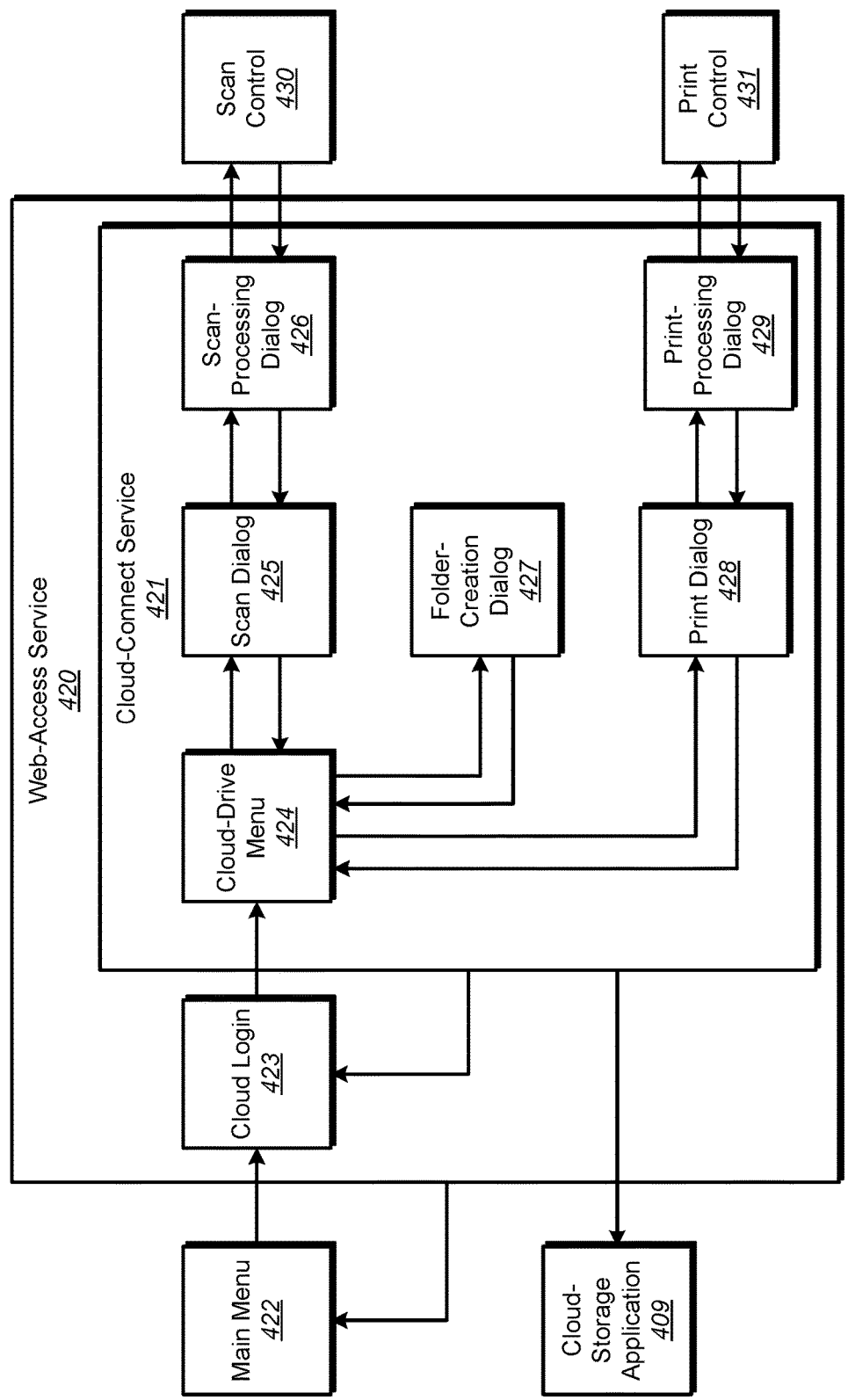
FIG. 4 illustrates an example embodiment of the components of a cloud service.

FIG. 4 illustrates an example embodiment of the components of a cloud service. In this example embodiment, the cloud service (e.g., the application 103) includes a web-access service 420 and a cloud-connect service 421. Also, at least part of the cloud service executes on an image processing device 101. The cloud service enables connection to and interaction with a cloud-storage application 409 that executes on a server 106 remotely located from the image processing device 101.

In operation, the cloud service generates a main menu 422 that includes a user-selectable image element that initiates execution of a connection with the cloud-storage application 409. The image processing device 101 shows the main menu 422 on an electronic visual display (e.g., LED screen, LCD screen). Upon receiving a notification that the user-selectable image element was selected, the web-access service 420 of the cloud service begins a cloud login 423. In some embodiments, the cloud login 423 sends a request to an authorization server to determine if the image processing device 101 that seeks to make use of the cloud-storage application 409 is authorized to do so. The cloud service (e.g., the cloud login 423) generates request data that includes a device identifier, a date or a time stamp, and information identifying the cloud service. The request is communicated to the authorization server, which determines whether the authorization permissions allow the particular image processing device 101 to use the application 103. The determination may be made based on the device identifier (device ID).

Also, the cloud login 423 may generate a user interface that enables a user to connect to the cloud-storage application 409 with user-specific login credentials. This authentication process may be a different authentication process than the authentication process that is used when users authenticate themselves to the image processing device 101. Additionally, the same credentials may be used in this authentication process with the cloud-storage application 409.

Once the image processing device 101 has been authorized, the web-access service 420 uses the cloud-connect service 421 to connect with the cloud-storage application 409. The cloud-connect service 421 generates a cloud-drive menu 424, which shows the cloud-service functions that are authorized for the image forming device 101. In this example, the functions include a scan function, a folder-creation function, and a print function.

If a user selects a scan function, then the cloud-connect service 421 generates a scan dialog 425. The scan dialog 425 generates a user interface that allows a user to selectively choose to scan physical documents into electronic documents. Once a user selects the scan functionality, the cloud-connect service 421 starts a scan-processing dialog 426, which interfaces with a scan control 430 of the image forming device 101 to carry out the operations that scan the physical documents to produce electronic documents. The electronic documents may then be transmitted from the image forming device 101 to the cloud-storage application 409, which stores the electronic documents.

Also, cloud-drive menu 424 may allow a user to selectively explore a file structure of a data store hosted by the cloud-storage application 409, for example to select previously-stored electronic document data to be transmitted to the image processing device 101 for output by the printer functionality of the image processing device 101. The cloud-drive menu 424 can be used to activate a folder-creation dialog 427, which allows a user to create a new folder in the cloud storage.

Furthermore, the cloud-drive menu 424 may allow a user to instruct the image processing device 101 to start a print dialog 428, which can be used to start a print-processing dialog 429 that retrieves a previously-stored electronic document from the cloud-storage application 409 and that interfaces with a print control 431 to cause the image processing device 101 to print the previously-stored electronic document.

In some embodiments, each of the scanning functionality and printing functionality are controlled via a subscription, such that a user may only use one of these functions. In these embodiments, the web-access service 420 may generate feature-specific requests that are used by the authorization server to determine if a particular device is able to make use of the selected functionality. Additionally, in some embodiments, the web-access service 420, in response to receiving an access request, selectively retrieves authorized-feature data that indicates which features of the web-access service 420 are available to the particular image processing device 101, and the web-access service 420 uses the authorized-feature data when generating the user interface (e.g., main menu 422) associated with the web-access service 420. For example, if the authorization server indicates that only the scan feature is available, the user interface may display an image element that enables selection of the scan-to-cloud-storage function. Also for example, the user interface can display an image element that indicates printing from the cloud storage as an option, but that makes the image element not selectable by a user—thus the printing feature could not be activated via the user interface at that time.

The cloud-connect service 421 is an application (e.g., web application) that allows image processing devices to scan documents into and print documents from cloud-storage services. Also, the cloud-connect service 421 may be hosted on a cloud server, and the cloud-connect service 421 may work as a central connector between the image processing device 101 and cloud-storage services (e.g., via respective cloud-storage applications 409). The cloud-connect service 421 can be provided as a subscription-based service that requires the use of an access-management mechanism.

The cloud-connect service 421 may be a hosted service implemented on one or more remote computers, and it may be remotely operated from the operating panel of the image processing device 101 by utilizing a browser that is implemented by the image processing device 101. The cloud-connect service 421 functions as a connector that connects cloud services and image-processing-device functions.

Figure 5:
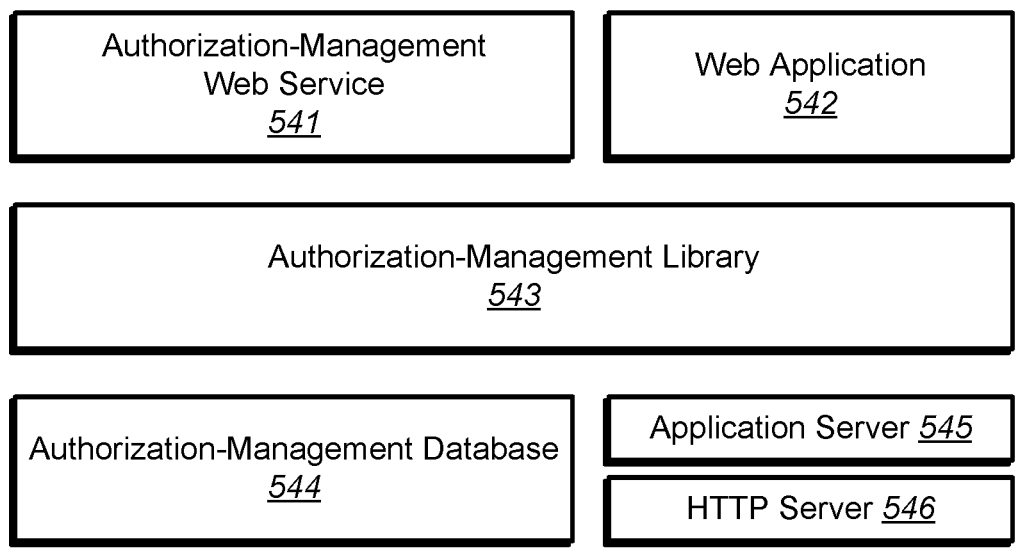
FIG. 5 illustrates an example embodiment of the components of a cloud-connect service.

FIG. 5 illustrates an example embodiment of the components of a cloud-connect service. The cloud-connect service includes an authorization-management web service 541, a web application 542, an authorization-management library 543, an authorization-management database 544, an application server 545, and an HTTP server 546.

The web application 542 may be operated from a browser on an image processing device, and the web application 542 can control an image processing device's scanner and printer.

The authorization-management web service 541 provides the following functions: authorization key application programming interface (API), an activation API, a deactivation API, and SSL client authentication.

The authorization-management library 543 checks the authorization-management database 544 to see if a device's authorization has expired or not. The authorization-management library 543 may be called by the authorization-management web service 541.

The authorization-management database 544 manages data for device verification and contains at least the following data: device serial number, expiration date. Also, the device serial number and the expiration date may be passed as activation API parameters. For example, in some embodiments, the authorization-management database 544 includes the following: service data that includes service information (URL), authorization-definition information (e.g., license schema), and billing information.

The following example describes a service that can be connected through https://cloudconnect, and 3 mon indicates that in 3 months, it costs 100 USD: https://cloudconnect, [3 mon, 6 mon, 12 mon, mon-recurring], [100 USD, 180 USD, 300 USD, 35 USD].

Also, attribute information of the user that subscribes to the service can be configured as user data, for example as shown below:

[User ID, Password, Mail Address, Available Services]
  [abc@xxx.com, ******, abc@xxx.com, https://cloud-connect].

The following authorization information can be specified as authorization data: user ID, service information (URL), authorization key, authorization period, authorization start date, authorization end date, and device ID. The following example of authorization data shows a possible format: [abc@xxx.com, https://cloudconnect, XXXX-YYYY-ZZZZ, 3 mon, 03/23/15, 06/23/15, AAAA-BBBB-CCCC].

Also, the cloud-connect-service authorization data may include the following: [Device ID, End Date]. For example, the cloud-connect-service authorization data may be [AAAA-BBBB-CCCC, 06/23/15].

Figure 6A:
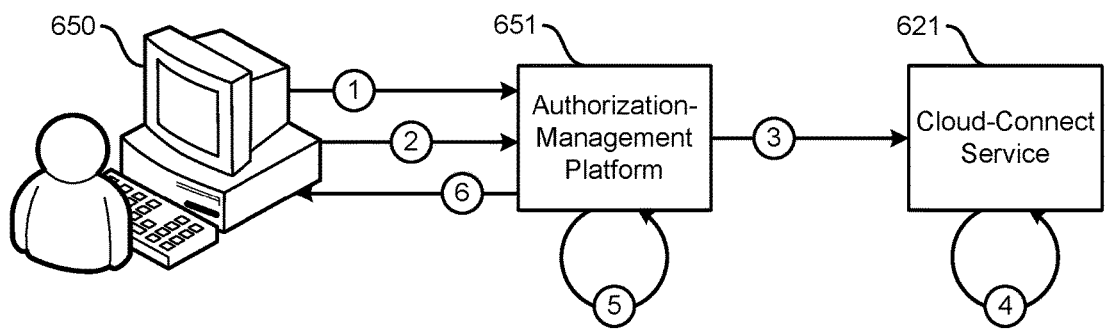
FIG. 6A illustrates an example embodiment of authorization-key retrieval.

FIG. 6A illustrates an example embodiment of authorization-key retrieval. In stage 1, a user (e.g., a dealer, an end user) enters the URL of the authorization-key retrieval page in a browser on a computing device 650, and the browser sends an authorization-page-retrieval request to an authorization-management platform 651, which is implemented by one or more computing devices (e.g., the servers 106 in FIG. 1). Next, the authorization-management platform 651 responds with HTML that describes an authentication page. Once the browser receives the HTML, it generates a display of the authentication page, which the computing device shows on a display device. The authentication page contains a user-ID-entry field, a password-entry field, and an authentication button.

In stage 2, once the user ID and password information are entered in the browser and the authentication button is activated, the browser sends an authentication request that includes the user ID and password information to the authorization-management platform 651. The authorization-management platform 651 responds by sending HTML that describes the authorization-key retrieval page. Once the browser on the computing device 650 receives the HTML, it generates a display of the authorization-key-retrieval page, and the computing device 650 causes the page to be presented on the display device. The authorization-key retrieval page contains the authorization period as an option based on the authorization-definition information. It may contain such options as 3 months, 6 months, 12 months, or an automatic monthly recurring subscription. Once an authorization is selected by the user and authorization-key retrieval is requested in stage 2, the browser sends the authorization period to the authorization-management platform 651.

Then in stage 3, the authorization-management platform 651 sends an authorization-key-retrieval request to a cloud-connect service 621 (e.g., authorization-management service on the cloud-connect service).

In stage 4, the cloud-connect service 621 generates an authorization key and sends the authorization key to the authorization-management platform. The authorization key may be a unique character string, and it may be in the form of a Universal Unique ID (UUID).

In stage 5, the authorization-management platform 651 creates authorization data, which may include the user ID, service information (URL), authorization key, and authorization period, in the database. For example, the authorization data may be generated based on the information that the user specified on the browser page that was shown on the display device, and the authorization data may be registered in the database.

Then in stage 6, the authorization-management platform 651 responds to the computing device 650 with HTML that describes the authorization-key retrieval completion page. Once the browser receives the HTML, it renders the authorization-key-retrieval-completion page.

In addition, the authorization-management platform 651 may send an authorization-key retrieval completion email to an email address bound to the login user, which was registered ahead of time. The authorization-key retrieval completion email contains the authorization key and a URL to the page for authorization-management-platform activation.

Figure 6B:
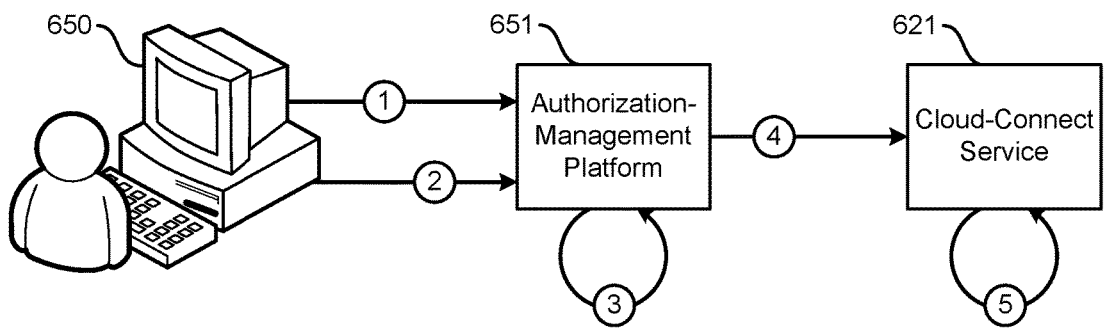
FIG. 6B illustrates an example embodiment of authorization-key activation.

FIG. 6B illustrates an example embodiment of authorization-key activation. In stage 1, a user (e.g., a dealer, an end user) enters the URL to the activation page in the browser on a computing device 650, and the browser retrieves the page. The browser sends an activation-page-retrieval request to the authorization-management platform 651. The authorization-management platform 651 responds with HTML that describes the authentication page. Once the browser receives the HTML, it renders the authentication page.

When user ID and password information are entered in the browser by the user and authentication is requested, then in stage 2 the browser sends an authentication request that includes the user ID and password information to the authorization-management platform 651. The authorization-management platform 651 responds with HTML that describes the activation page. Once the browser receives the HTML, it renders the activation page.

The activation page contains a list of registered authorization keys that are bound to the user, a device-ID-entry field, and an activation button. The authorization key is the authorization key that was previously generated, and device ID is an identifier used for device identification.

When the device ID that is associated with the authorization key is entered via the browser on the computing device 650 and the activation button is activated, the browser sends the authorization key and the device ID to the authorization-management platform 651.

In stage 3, the authorization-management platform selects the authorization data that includes the specified authorization key from the database and updates the authorization start date, the authorization end date, and the device ID in the authorization data. The authorization start date indicates the date on which the activation instruction was accepted. The authorization end date indicates the date on which the authorization period ends.

In stage 4, an activation request is sent to a cloud-connect service 621 (e.g., an authorization-management service on a cloud-connect service). The activation request contains the device ID and the authorization end date.

In stage 5, the cloud-connect service 621 creates authorization data, which includes the service information, the user ID, and the authorization key, and adds the authorization data to a database (e.g., an authorization-management database). Next, the cloud-connect service 621 responds to the authorization-management platform 651 with a notification that activation was successful. Then the authorization-management platform 651 sends HTML that describes the activation-completion page to the browser. Once the browser receives the HTML, it renders the activation-completion page. Thus, the authorization data, in which the subscription period for the specified service is configured, and the device ID of the device that can use the service are bound and activated.

Figure 7A:
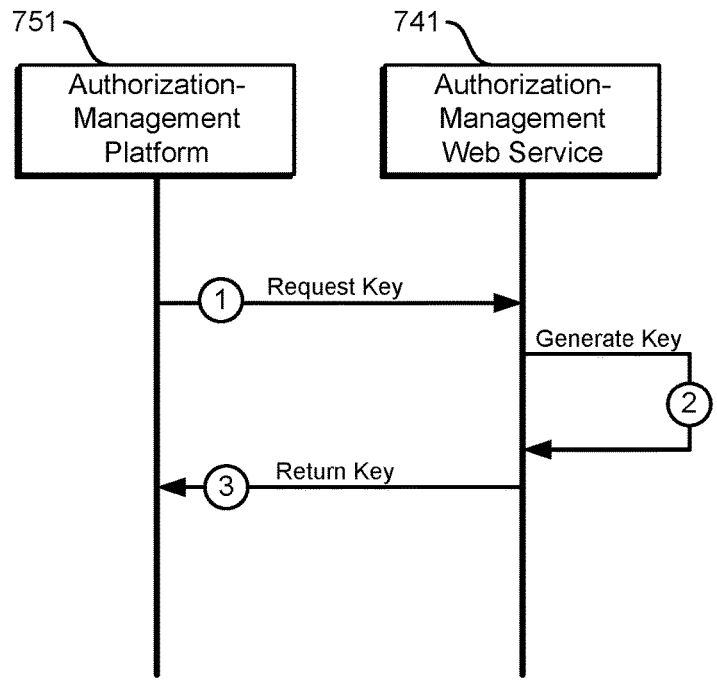
FIG. 7A illustrates a timing diagram for an example embodiment of a cloud service.

FIG. 7A illustrates a timing diagram for an example embodiment of a cloud service. In stage 1, an authorization-management platform 751 sends a request for a key to an authorization-management web service 741. In stage 2, the authorization-management web service 741 generates a key. Finally, in stage 3, the authorization-management web service 741 sends the generated key to the authorization-management platform 751.

Figure 7B:
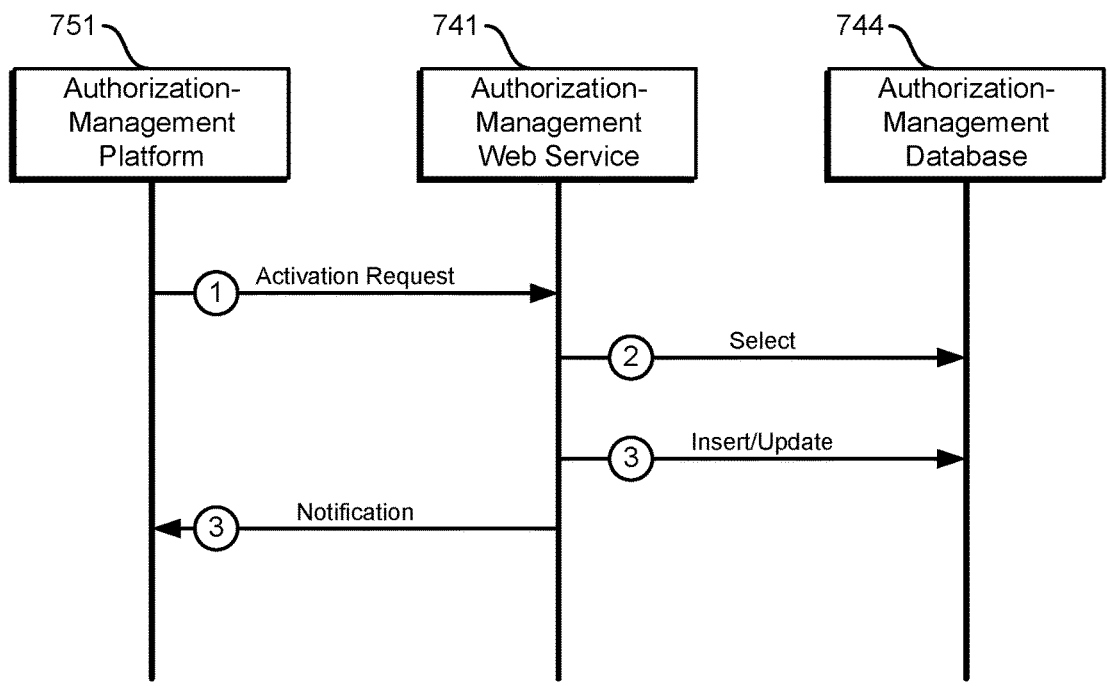
FIG. 7B illustrates a timing diagram for an example embodiment of a cloud service.

FIG. 7B illustrates a timing diagram for an example embodiment of a cloud service. In stage 1, an authorization-management platform 751 sends an activation request for a device to an authorization-management web service 741. In stage 2, the authorization-management web service 741 selects a corresponding entry for the device in an authorization-management database 744 or determines if an entry for the device does not exist in the authorization-management database 744. In stage 3, the authorization-management web service 741 inserts a new entry for the device if the device did not exist or updates an entry for the device if the corresponding entry was selected. Finally, in stage 4, the authorization-management web service 741 sends a notification of success to the authorization-management platform 751.

Figure 8A:
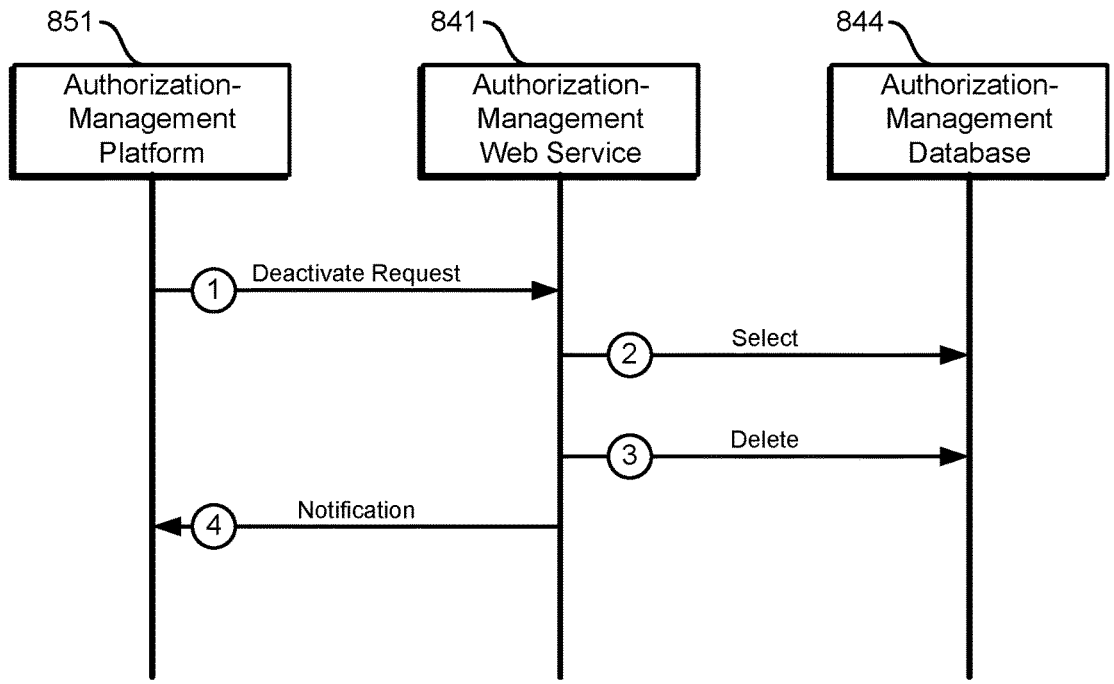
FIG. 8A illustrates a timing diagram for an example embodiment of a cloud service.

FIG. 8A illustrates a timing diagram for an example embodiment of a cloud service. In stage 1, an authorization-management platform 851 sends a deactivate request for a device to an authorization-management web service 841. Then in stage 2, the authorization-management web service 841 selects an entry in an authorization-management database 844 that corresponds to the device. In stage 3, the authorization-management web service 841 sends a request to delete the corresponding entry from the authorization-management database 844. Finally, in stage 4, the authorization-management web service 841 sends a notification of success to the authorization-management platform 851.

Figure 8B:
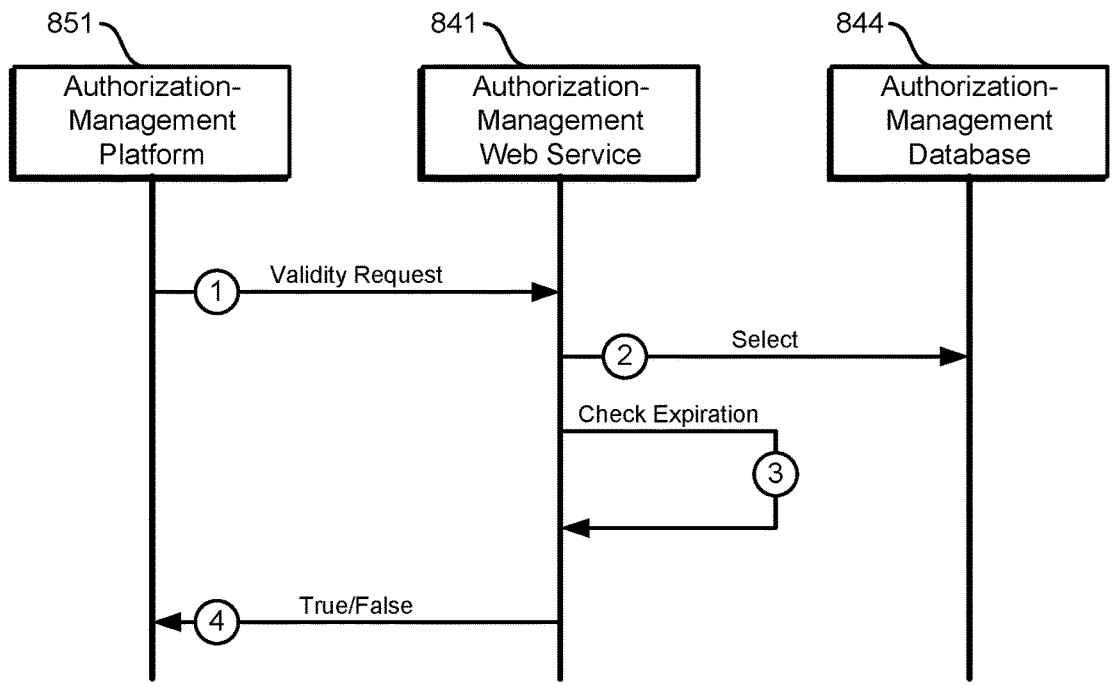
FIG. 8B illustrates a timing diagram for an example embodiment of a cloud service.

FIG. 8B illustrates a timing diagram for an example embodiment of a cloud service. In stage 1, an authorization-management platform 851 sends a validity request for a device to an authorization-management web service 841. Then in stage 2, the authorization-management web service 841 selects and retrieves an entry in an authorization-management database 844 that corresponds to the device. In stage 3, the authorization-management web service 841 checks the entry to determine if the authorization for the device has expired. Finally, in stage 4, if the authorization has not expired, then the authorization-management web service 841 sends a notification of "true" to the authorization-management platform 851. However, if the authorization has expired, then in stage 4 the authorization-management web service 841 sends a notification of "false" to the authorization-management platform 851.

Figure 9:
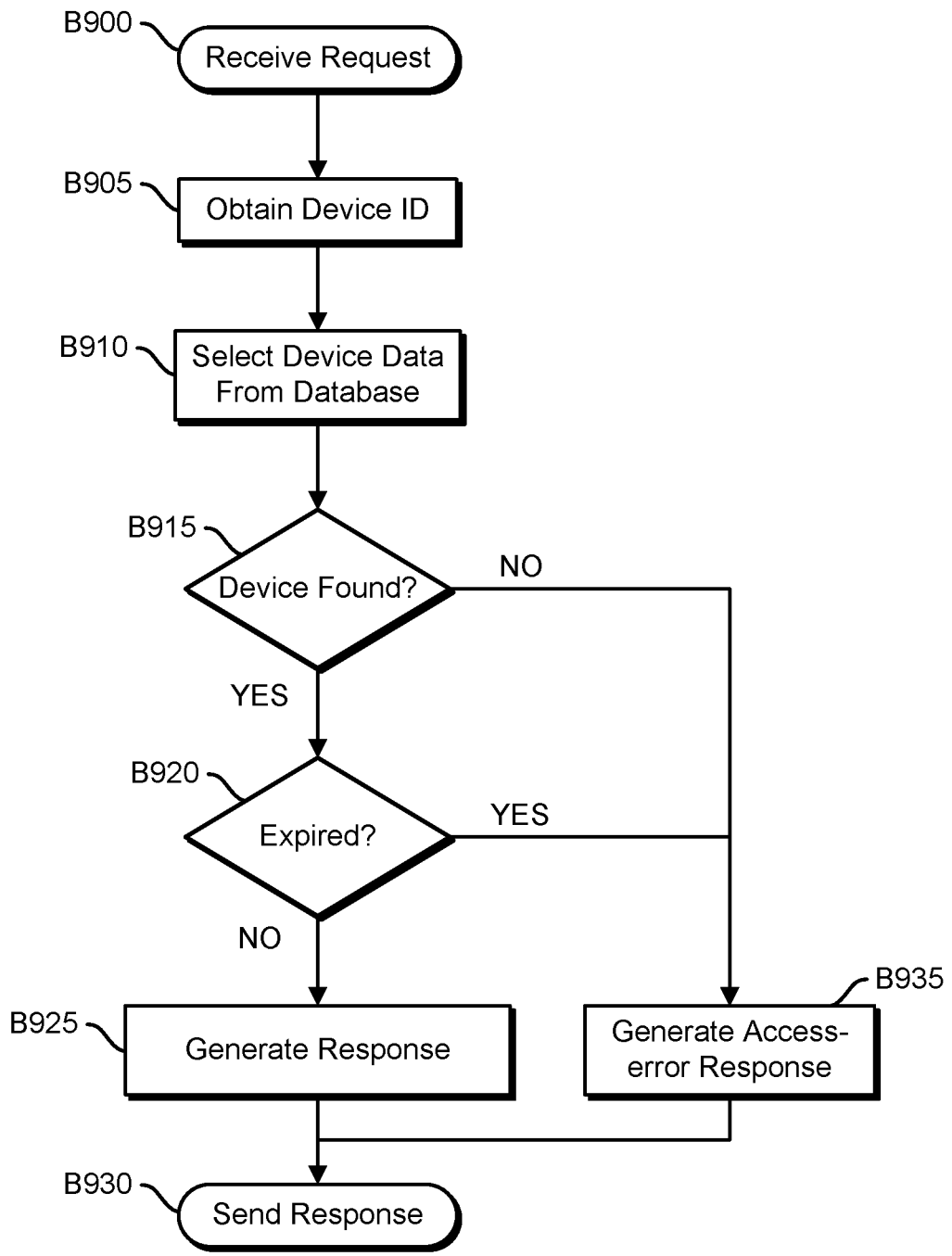
FIG. 9 illustrates an example embodiment of an operational flow for providing a cloud service.

FIG. 9 illustrates an example embodiment of an operational flow for providing a cloud service. The blocks of this operational flow and the other operational flows that are described herein may be performed by one or more computing devices, for example the computing devices that are described herein. Also, although this operational flow and the other operational flows that are described herein are each presented in a certain order, some embodiments may perform at least some of the operations in different orders than the presented orders. Examples of possible different orderings include concurrent, overlapping, reordered, simultaneous, incremental, and interleaved orderings.

The flow starts in block B900, where a request is received. For example, when a user enters the URL for cloud-connect service web application in a browser on an image processing device, the browser can send an application-page-retrieval request to a cloud-connect service. Then in block B905, when the cloud-connect service receives the application-page-retrieval request, it obtains a device ID included in the application-page-retrieval request. The flow then moves to block B910, where the cloud-connect service attempts to select the authorization data that includes the device ID from a database (e.g., an authorization-management database).

Next, in block B915, if the authorization data selected in block B910 does not exist (B915=no), then flow moves to block B935. If the authorization data does exist (B915=yes), then the flow moves to block B920. In block B920, the cloud-connect service compares the authorization end date contained in the authorization data with the current date and checks whether the authorization has expired. If the authorization data has expired (B920=yes), then the flow moves to block B935. If the data has not expired (B920=no), then the flow moves to block B925, where a response, which indicates that the authorization has not expired, is generated. The flow then proceeds to block B930.

If the flow moves to block B935, then in block B935, the cloud-connect service generates an access-error response (e.g., HTML that describes an authorization-error page), and then the flow moves to block B930.

In block B930, the generated response is sent to the requesting device or application (e.g., browser).

Thus, in some embodiments, a service related to the user's authorization can be activated so that it can be used on an image processing apparatus (e.g., a multi-function printer) that has the specified device ID. Versatile authorization management becomes possible, for example allowing a designated cloud service to be used for an authorization period of 3 months from device A, but not from device B. Even if the service was activated on device A, it can be managed so that documents can be uploaded from device A to the cloud service while the designated user is authorized to use the service. However, no documents can be uploaded from device A once the user's authorization period expires.

Figure 10:
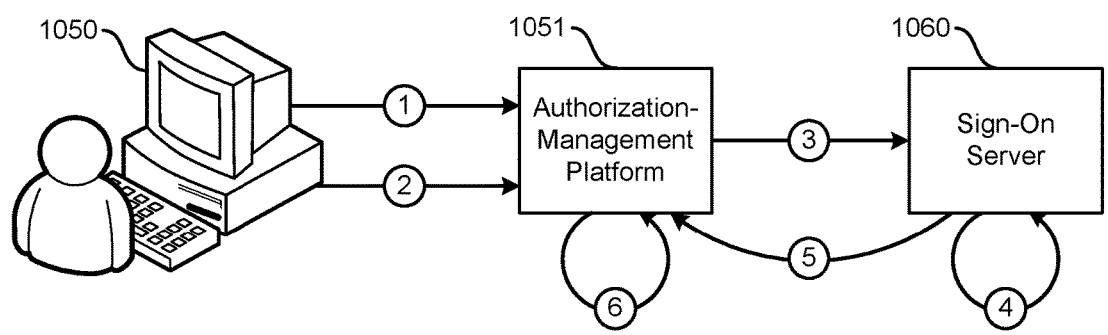
FIG. 10 illustrates an example embodiment of an application for service.

FIG. 10 illustrates an example embodiment of an application for service. In stage 1, a user (e.g., a dealer, an end user) enters the URL of service-application page in a browser on a computing device 1050, which sends a request for the page to an authorization-management platform 1051. Next, authorization-management platform 1051 responds with HTML that describes the authentication page. Once the browser receives the HTML, it renders the authentication page. After the user ID and password information are entered in the browser and authentication is requested, the browser sends an authentication request that includes the user ID and the password information to the authorization-management platform 1051. Then the authorization-management platform 1051 responds with HTML that describes the service-application page.

Once the browser receives the HTML, it renders the service-application page. The service-application page contains the options for available services and an application button. Once a service is selected and the application button is activated, then in stage 2 the browser sends a service-application request to the authorization-management platform 1051. Next, in stage 3, the authorization-management platform 1051 sends the service-application request, which may include dealer information, to a sign-on server 1060. In stage 4, the sign-on server 1060 queries the dealer information and determines if use of the service is permitted. Then, in stage 5, the sign-on server 1060 responds with permission to use the service.

Next, in step 6, the authorization-management platform 1051 selects the user data from a database (e.g., an authorization-management database) and updates the available services included in the user data. Finally, the authorization-management platform 1051 responds to the browser with HTML that describes a service-application-completion page. Once the browser receives the HTML, it renders the service-application-completion page.

Figure 11:
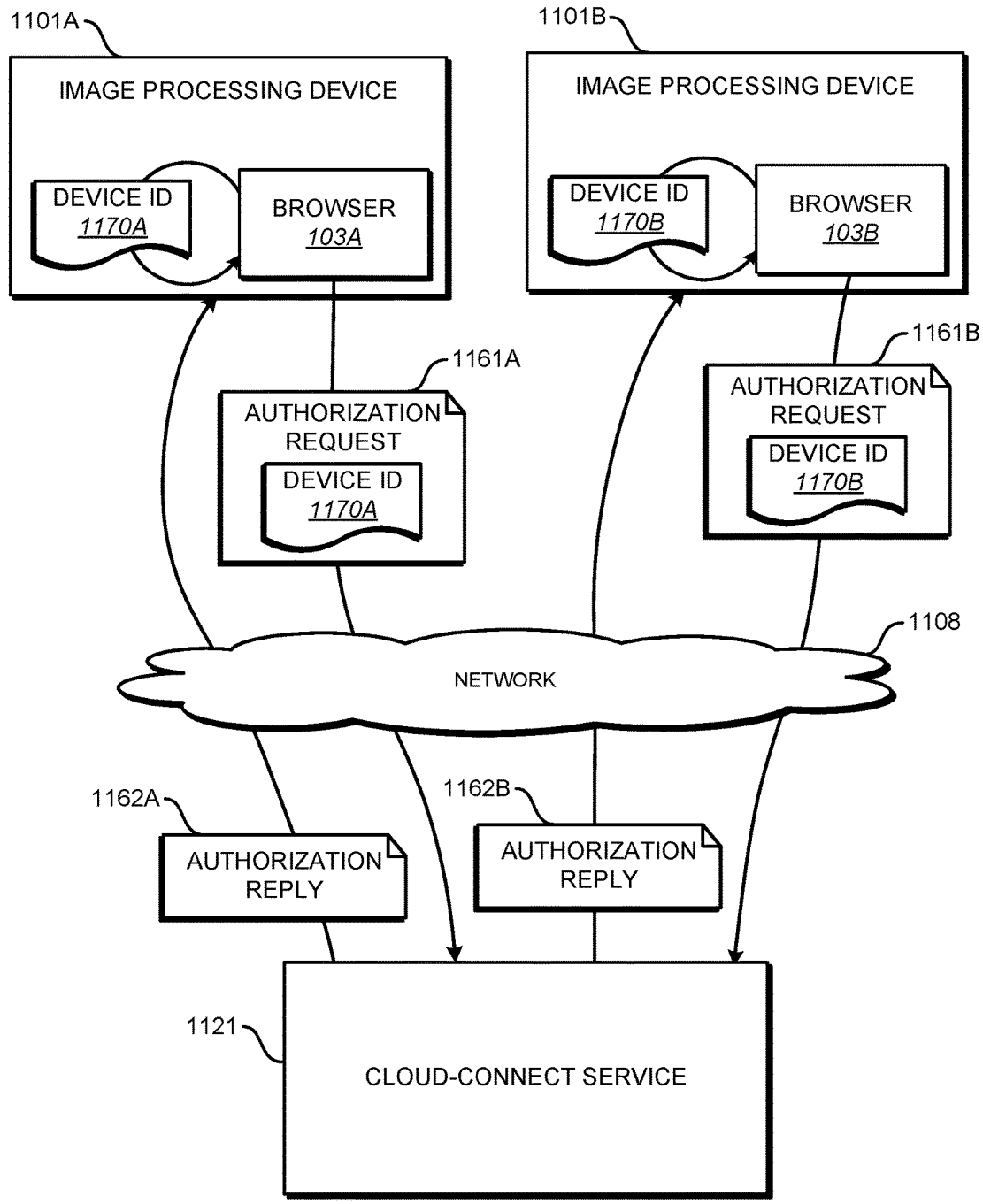
FIG. 11 illustrates the flow of information in an example embodiment of a system for authorizing a service.

FIG. 11 illustrates the flow of information in an example embodiment of a system for authorizing a service. The system includes a first image processing device 1101A, a second image processing device 1101B, and a cloud-connect service 1121, which communicate by means of a network 1108. The first image processing device 1101A operates a first browser 103A, and the first browser 103A obtains a first device ID 1170A, which is the device ID of the first image processing device 1101A. The first browser 103A sends a first authorization request 1161A, which includes the first device ID 1170A, to the cloud connect service 1121. Once the cloud-connect service 1121 obtains the first authorization request 1161A, the cloud-connect service 1121 determines whether to grant authorization to use a service (e.g., a cloud-storage service) based on the first device ID 1170A. The determination may be based on only the first device ID 1170A, or the only identifier used in the determination may be the first device ID 1170A. Then the cloud-connect service 1121 sends a first authorization reply 1162A, which includes the results of the determination whether to grant authorization, to the first image processing device 1101A.

Also, the second image processing device 1101B operates a second browser 103B, and the second browser 103B obtains a second device ID 1170B, which is the device ID of the second image processing device 1101B. The second browser 103B sends a second authorization request 1161B, which includes the second device ID 1170B, to the cloud connect service 1121. Once the cloud-connect service 1121 obtains the second authorization request 1161B, the cloud-connect service 1121 determines whether to grant authorization to use a service based on the second device ID 1170B. Then the cloud-connect service 1121 sends a second authorization reply 1162B, which includes the results of the determination whether to grant authorization, to the second image processing device 1101B.

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board that is inserted into a device or on a function-extension unit that is connected to the device, and a CPU provided on the function-extension board or unit may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:
1. A system comprising:
a service-provider device that includes one or more hardware processors and a memory; and
a browser loaded on an image processing device that includes one or more hardware processor and a memory, wherein to connect the service-provider device with the image processing device,
the browser fetches device-specific data from the image processing device, the device-specific data being specific to and uniquely identifies the image processing device, and
sends the device-specific data to the service-provider device with a request for access to a service of the service-provider device for use by the image processing device, and the service-provider device receives the device-specific data of the image processing device;

generates, based on the received device-specific data, a key as part of authorization data that is provided to the image processing device, the authorization data identifying one or more services authorized for use by the image processing device and the key is usable by the image processing device to enable use of the one or more services by the image processing device, receives data indicating a request for access to at least one feature of an application;

compares the request for access with the authorization data to determine if the request should be granted, sends a grant of permission to access the at least one feature in a case where the request matches the authorization data, and sends a denial of permission in a case where the request does not match the authorization data.

2. A service-provider device that authorizes one or more services for use by an image processing device comprising:

at least one memory storing instructions; and one or more hardware processors that execute the set of instructions and that are configured to cause the service provider device to receive device-specific data of the image processing device;

generate, based on receiving the device-specific data, a key as part of authorization data that is provided to the image processing device, wherein the authorization data identify the one or more features of an application authorized for use by the image processing device and the key is usable by the image processing device to enable use of the one or more features of the application by the image processing device;

receive data indicating a request for access to at least one feature of an application;

compare the request for access with the authorization data to determine if the request should be granted, send a grant of permission to access the at least one feature in a case where the request matches the authorization data, and send a denial of permission in a case where the request does not match the authorization data.

3. The service-provider device of claim 2, wherein the device-specific data is stored with the authorization data, which defines authorization permissions.

4. The service-provider device of claim 2, wherein the at least one feature is a print function or a scanning function.

5. The service-provider device of claim 2, wherein the request for access includes device-specific information of a requesting device.

6. The service-provider device of claim 2, wherein the one or more hardware processors are further configured to cause the device to generate a graphical user interface that includes a control that, when activated, initiates sending the request for access to the at least one feature of the application; and send the graphical user interface to the image processing device.

7. The service-provider device of claim 6, wherein the graphical user interface is described in HTML.

8. An image processing device which accesses a service-provider-device comprising:

a browser loaded on the image processing device that includes one or more hardware processors and at least one memory, wherein to get an approval from the service-provider device to use a service, the browser fetches a device ID from the image processing device, the device ID being specific to and uniquely identifies the image processing device, sends the device ID to the service-provider device with a request for access to the service to be provided on the image processing device, wherein it is determined by the service-provider-device whether the service is allowed to be provided on the image processing device by checking whether the device ID is registered in the service-provider device, and in a case where it is determined by the service provider device that the service is allowed, receive a grant of permission to use the service and authorization data that includes a key that is generated by the service provider device and which is based on the device ID, the authorization data identifying the service authorized for use by the image processing device and usable by the image processing device to enable use of the service by the image processing device, and in a case where it is determined by the service provider device that the service is not allowed, receive, from the service provider device, a denial of permission to the image processing device.

9. The image processing device of claim 8, wherein in response the service-provider device determining that the requested service is allowed to be provided, the image processing device receives the service from the service-provider device for use on the image processing device.

10. The image processing device of claim 9, wherein The service provided by the service-provider device is at least partially executed on the image processing device.

11. The system of claim 1, wherein the service provided by the service-provider device is at least partially executed on the first device.

12. The service-provider device of claim 2, wherein the one or more features of an application authorized for use are provided by the service-provider device for use by the image processing device.

13. The service-provider device of claim 12, wherein the one or more features of an application are at least partially executed on the image processing device.

14. The system of claim 1, wherein the device specific data is received from the browser of the image processing device.

15. The system of claim 1, wherein the browser is a web browser.

16. The service provider device of claim 2, wherein the device specific data is received from the browser of the image processing device.

17. The service provider device of claim 2, wherein the browser is a web browser.

18. The image processing device of claim 8, wherein the device ID is received from the browser of the image processing device.

19. The image processing device of claim 8, wherein the browser is a web browser.

* * * * *